Patented June 12, 1945

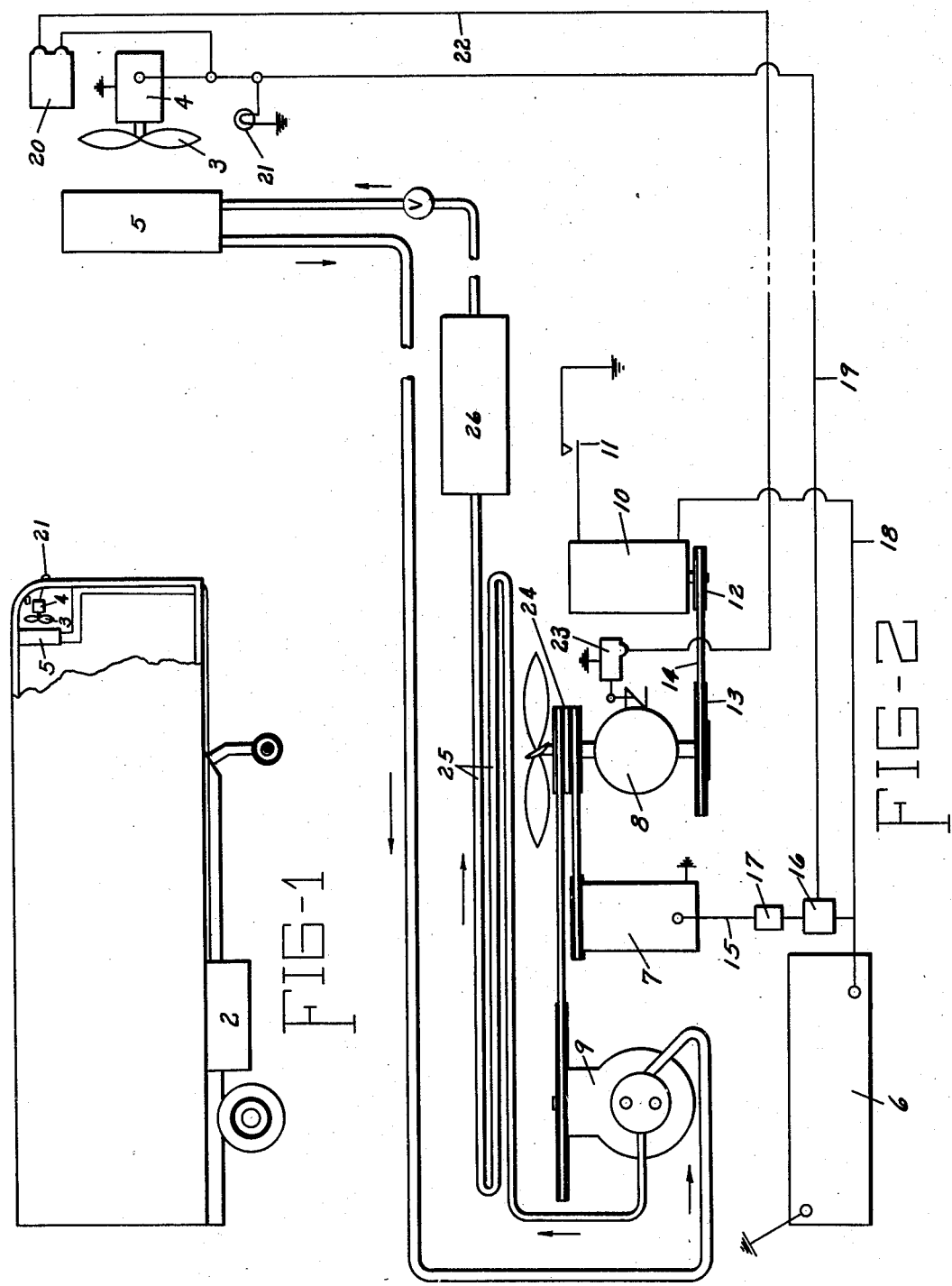

2,378,063

UNITED STATES PATENT OFFICE 2,378,063

REFRIGERATING MEANS FOR VEHICLES

Adna R. Clark, Chicago, Ill., and Claude R. King and Harold J. King, Oelwein, Iowa Application August 9, 1944, Serial No. 548,724

2 Claims. (Cl. 62—4)

Our present invention relates to temperature controlling mechanism for use in connection with vehicles, the purpose of which is to maintain in such vehicles a substantially constant temperature, with an even distribution thereof throughout the vehicle. Another object is the provision of an automatically functioning mechanism of the type indicated in which a continuously functioning internal combustion engine can operate at two speeds, either of which will cause a generator to function for the purpose of charging a battery, and the faster of which will cause operation of a compressor whereby a refrigerant is circulated through a radiating system to cause cooling of an enclosed space. Our invention comprises such further objects, advantages, and capabilities as will hereafter appear and as are inherent in the construction disclosed herein, and it further resides in the combination, construction, and arrangement of parts illustrated in the accompanying drawing and, while we have shown therein what is now regarded as the preferred embodiment of this invention, we desire the same to be illustrative only and not to be interpreted in a limiting sense.

The present application is, in part, a continuation of our prior application, Serial No. 390,674, filed April 28, 1941. The drawings are, however, much more simple in appearance, although covering the same invention.

In the present drawing,

Fig. 1 shows, in side elevation, partly broken away, a trailer unit having our refrigerating system installed therein; and Fig. 2 shows this installation, schematically, for the purpose of ready explanation of the operation thereof.

In Fig. 1, the numeral 1 designates a vehicle of any desired type having a cabinet 2 mounted on the outside thereof, preferably underneath the body of the vehicle. Most of the apparatus shown in Fig. 2 is mounted in this cabinet 2 but the air-circulating fan 3, provided with an electric motor 4, is shown as mounted in the forward end of the vehicle, in the upper part thereof, and in a position to blow air through the evaporator 5 for the purpose of circulating the cooled air throughout the vehicle.

Reference will now be made more particularly to Fig. 2 in which is shown at 6 an ordinary secondary battery, at 7 a generator for charging this battery, and at 8 an internal combustion motor or engine for driving the generator 7 and the compressor 9. A starting motor for starting the internal combustion engine 8 is shown at 10, and the circuit of this motor is provided, between the battery 6 and the ground, with a starting switch 11 of any approved type. This switch is normally open, being closed only when it is necessary to use the motor 10 for starting the engine 8. Pulleys 12 and 13 are provided on the shafts of the motors 10 and 8, respectively, and these pulleys are connected by a belt 14. An overrunning clutch is provided in connection with one of these pulleys so that the motor 10 may remain idle while the motor 8 is functioning as a drive unit.

A circuit 15 connects the battery 6 to the generator 7 which is preferably grounded on the frame of the vehicle, the same as the switch 11. In this circuit 15, between the generator 7 and the battery 6 are located a magnetic switch 16 and a generator cutout switch 17. The circuit 18 connects the battery with the starting motor 10. From the magnetic switch 16, the circuit 19 leads to a fan-motor 4 and a thermostat 20. An electric signal lamp 21 is in a branch circuit from the circuit 19 and it will therefore be apparent that whenever the fan-motor 4 is functioning, the signal lamp 21 will indicate this fact.

Current flowing through the magnetic switch 16 and circuit 15 keeps the line 19 to fan-motor 4 alive so that air is continuously circulated by the fan 3 through the evaporator 5, the result being that cool air is circulated throughout the vehicle as long as the line or circuit 19 is alive.

The thermostatic switch 20 is connected in the circuit 22 leading to a magnetic control or solenoid 23 for the throttle of the engine 8. This thermostatic switch 20 is located adjacent the fan 3 so that it will be affected by the temperature of the air being passed through the evaporator 5. Whenever this thermostatic switch is open, the solenoid control for the engine throttle valve permits this valve to close because the temperature of the air is such that it is not necessary to have the compressor 9 functioning. Therefore, the throttle closes to idling speed. This results in the engine 8 slowing down, and this permits the centrifugal clutch in the driving connection between the motor 8 and the compressor 9 to be disconnected, thus stopping the drive of the compressor. When the temperature of the air again rises to such a point that the thermostatic switch 20 is closed, the solenoid 23 will cause opening of the throttle valve and increase in the engine speed. This, in turn, will cause the centrifugal clutch at 24 to be engaged, whereby again to start the driving of the compressor 9.

It is evident from the foregoing that the engine 8 runs, normally at either idling speed or fast. Whichever way it runs, the generator 7 is driven fast enough to cause charging of the battery 6. However, if the engine should stop, then the cutoff switch 17 would open the circuit 15 so as to prevent draining of the charge of battery 6 through the generator. When the magnetic switch 16 opens, it breaks the circuit 19 to the signal light 21, the fan-motor 4, and the thermostat 20. If the engine 8 should stop, this would cause opening of all circuits and a complete shutdown of the system.

As usual, this system comprises a condenser 25 and a receiving tank 26 for the liquid returned from the condenser 25 to the evaporator 5. The direction of travel of the refrigerant is shown in the drawing by the arrows which indicate that the refrigerant passes from the compressor 9, through the condenser 11, receiving tank 26, and evaporator 5, from which it is returned as a gas to the compressor 9. This being common construction and operation, no further attention need be paid thereto.

As indicated above, there is an overrunning clutch in the connection between the electric motor 10 and the engine 8 so that the latter is permitted to run while the motor 10 stands still. It has also been indicated that there is a centrifugal clutch connected to the pulley 24 on the engine shaft which permits the engine to run at a low speed without driving the compressor and which, when the engine speeds up, causes it to drive the compressor, supplying cooled and condensed refrigerant to the evaporator 5, which cools the air run through the evaporator by the fan 3 and circulated throughout the vehicle.

While we have shown, more or less diagrammatically, apparatus embodying the principle of this invention, it will of course be understood that minor modifications may be made therein without departing from said principle.

Having now described our invention, we claim:

1. In a temperature control system, having a compressor, an evaporator, and a condenser, connected in fluid circuit relation, the combination of a gas engine adapted for continuous operation at different speeds, said engine being provided with thermostatically controlled throttle mechanism for controlling the engine speed in accordance with the temperature condition of the space in which the thermostat is located, a secondary battery, an electric generator for charging the battery, a driving connection between the engine and the compressor, including a centrifugal clutch, the operation of which is governed by the speed of operation of the engine, the functioning of the compressor being discontinued upon decrease in speed of the engine and release of said clutch, a generator cutout switch in circuit between the generator and the battery, a continuously operating constant speed air circulator adjacent the evaporator for keeping air circulating therethrough at a constant rate, means for starting the engine into operation, a magnetic switch in circuit between the battery and the air circulator to interrupt the air circulator circuit in the event the engine stops, and electric circuit connections between the battery and the generator through the magnetic switch and generator cutout, the generator cutout switch disconnecting the battery from the generator in the event the generator stops.

2. In a temperature control system, having a compressor, an evaporator, and a condenser, connected in fluid circuit relation, the combination of an internal combustion engine adapted for continuous operation at different speeds, said engine being provided with thermostatically controlled throttle mechanism for controlling the engine speed in accordance with the temperature condition of the space in which the thermostat is located, a secondary battery, an electric generator for charging the battery, a driving connection between the engine and the compressor, including a centrifugal clutch, the operation of which is governed by the speed of operation of the engine, the functioning of the compressor being discontinued upon the slowing down of the engine, a continuously operating constant speed air circulator adjacent the evaporator for keeping air circulating therethrough at a constant rate, means for starting the internal combustion engine into operation, a magnetic switch in circuit between the battery and the air circulator to interrupt the air circulator circuit in event the engine stops, and a switch functioning to disconnect the generator from the battery upon the engine ceasing to cause the generator to function.

ADNA R. CLARK.
CLAUDE R. KING.
HAROLD J. KING.